(12) United States Patent
Reed et al.

(10) Patent No.: US 6,823,180 B2
(45) Date of Patent: Nov. 23, 2004

(54) METHOD AND APPARATUS FOR ADAPTING ANTENNA VISIBILITY IN A WIRELESS COMMUNICATIONS UNIT

(75) Inventors: John Douglas Reed, Arlington, TX (US); Jack Anthony Smith, Bedford, TX (US)

(73) Assignee: Motorola, Inc., Schaumburg, IL (US)

( * ) Notice: Subject to any disclaimer, the term of this patent is extended or adjusted under 35 U.S.C. 154(b) by 244 days.

(21) Appl. No.: 10/021,755

(22) Filed: Dec. 12, 2001

(65) Prior Publication Data

US 2003/0109217 A1 Jun. 12, 2003

(51) Int. Cl.[7] .................................................. H04B 1/10
(52) U.S. Cl. ................. 455/305; 455/562.1; 455/575.7; 455/41.1; 455/41.2; 455/101; 455/13.3; 455/426.2; 343/757; 343/754
(58) Field of Search ................................ 455/305, 11.1, 455/13.3, 562, 101, 102, 97, 66, 73, 69, 277.1, 277.2, 562.1, 41.1, 41.2, 575.7; 342/374, 367, 463, 359, 373; 343/757, 754

(56) References Cited

U.S. PATENT DOCUMENTS

| | | | |
|---|---|---|---|
| 5,488,737 A | 1/1996 | Harbin et al. ............... 455/33.1 |
| 5,513,176 A | 4/1996 | Dean et al. .................... 370/18 |
| 5,633,873 A | 5/1997 | Kay et al. ..................... 370/336 |
| 5,903,826 A | * 5/1999 | Nowak ..................... 455/277.1 |
| 5,952,966 A | * 9/1999 | Smith .......................... 342/373 |
| 5,983,117 A | 11/1999 | Sandler et al. .............. 455/557 |
| 6,029,057 A | * 2/2000 | Paatelma et al. ......... 455/277.2 |
| 6,058,105 A | * 5/2000 | Hochwald et al. .......... 370/310 |
| 6,067,449 A | * 5/2000 | Jager ....................... 455/277.2 |
| 6,108,526 A | * 8/2000 | van der Plas ................. 455/78 |
| 6,150,987 A | * 11/2000 | Sole et al. ................... 343/757 |
| 6,167,286 A | * 12/2000 | Ward et al. ................ 455/562 |
| 6,314,305 B1 | * 11/2001 | Solondz et al. ............. 455/562 |
| 6,330,458 B1 | * 12/2001 | Lamoureux et al. ........ 455/561 |
| 6,351,499 B1 | * 2/2002 | Paulraj et al. .............. 375/267 |

* cited by examiner

Primary Examiner—Marceau Milord
(74) Attorney, Agent, or Firm—Posz & Bethards, PLC; Charles W. Bethards

(57) ABSTRACT

A method within and wireless communications unit (WCU) arranged to operate in a fixed wireless network including a transceiver for receiving and transmitting signals within the network; an antenna system having adjustable visibility to the fixed wireless network; and a controller, coupled to the transceiver and the antenna system, to control the transceiver and to adjust the visibility of the antenna system such that the visibility of the WCU to the fixed wireless network is adjustable.

21 Claims, 4 Drawing Sheets

- *PRIOR ART* -

400

500

600

METHOD AND APPARATUS FOR ADAPTING ANTENNA VISIBILITY IN A WIRELESS COMMUNICATIONS UNIT

FIELD OF THE INVENTION

This invention relates in general to communication systems, and more specifically to a method and apparatus for adapting antenna visibility for communications units within wireless networks.

BACKGROUND OF THE INVENTION

The traditional approach used for terrestrial wireless communication networks such as cellular networks consists of dividing the desired coverage area into a set of overlapping regions, where all of the subscribers within each region are served from a single transceiver known as a base station using a point-to-multipoint (PMP) or one-to-many approach. One of the problems with a PMP architecture is that it becomes more difficult to establish links directly between a given subscriber radio and the base station as the transmission carrier frequency increases, which poses a problem for future wireless networks since they are increasingly being deployed at higher carrier frequencies.

Other problems are the economic burdens associated with deploying a system since large costs are incurred during deployment of the infrastructure before any revenue can be raised to offset those expenses. Additionally there are extensive problems of coordination and planning and expense associated with expanding such systems. To avoid or address these problems to one extent or another, a new type of network architecture known as "mesh" architecture is being explored. Some systems are being proposed and deployed for providing relatively broadband packet data services to residential customers. Some fixed wireless systems or networks that are part PMP and part mesh network have been proposed and may be referred to as hybrid systems or networks. These systems may be initially deployed in part as PMP systems with each of the communications units in the PMP arrangement also acting as wireless network access points for clusters of communications units operating in a mesh network arrangement.

In a mesh architecture 100, such as depicted in FIG. 1, a multiplicity of communications units, A–C and E–G 101–105 and 109–113 are deployed, normally one or more per household or business and operate in an ad-hoc peer to peer fashion to establish links where possible and as required among each of a given units neighbors. For example unit A can establish links or paths 117, 119, 121 with, respectively units E, D, and B since as is typical the units employ an omni-directional antenna. Some units can employ a directional antenna 123 such as unit E and this limits their ability to see (establish links with) units that are not in the direction of their antenna and improves their ability to see units in the direction of the antenna. Unit D 107 operates as a hybrid unit. Unit D is coupled to a base station 117 using a PMP link or path preferably acting as a network access point and in a mesh mode for and with the other units. This mesh network at the end of a PMP link is often referred to as a cluster.

Each or many of the communications units have the ability to relay communications signals from an originating communications unit to a target unit when these communications units are not able to create a direct communication link or path from one to the other unit. Information that is being communicated may be relayed or handed from communications unit to communications unit until it reaches the intended destination or target unit. For example, if unit E wanted to communicate with unit F 111, information from unit E would be relayed by unit D to unit F. Note: that if the direct link from unit D to F were interrupted by a tree growing or new house being constructed, the inherent redundancy in the mesh architecture allows routing the information from unit D through unit C or unit G. In this fashion the infrastructure or backbone that is represented by the traditional base stations and supporting equipment is in a sense deployed as the system gains customers and begins to realize revenue.

However the mesh architecture or system can also experience problems. For example when only a few units have been deployed they may need to have high antenna visibility in order to reach another unit. However as the density of the communications units increases the degree or amount of interference for one unit caused by all other units also increases and this can significantly decrease system capacity. Suddenly the system or at least units in a mesh mode need lower antenna visibility.

To appreciate the problems caused by this interference lets review a typical way of initiating communication between communications units. It begins with the transmission of a "Request-to-send" (RTS) packet by the initiating unit. The RTS packet is typically received by all units within the transmission range of, or that can see, the initiating unit. The RTS packet notifies these units that the initiating unit would like to establish a communication link with a target unit whose identity is specified within the packet contents.

Upon successfully receiving this RTS packet, the target unit will respond with a "Clear-to-send" (CTS) packet that notifies the initiating radio that the target unit is ready to begin receiving transmissions from the initiating unit. The CTS packet also serves notice to the rest of the units in the area that the transmission medium has been reserved so that they can refrain from simultaneous transmissions that might interfere with the prearranged transmissions. Note that any relaying units and their neighbors will also be notified and will need to refrain from simultaneous communications. Because all other units in the area of the target unit, originating unit, and relaying units, if any, are forced to remain idle during the subsequent communications between the initiating and target units, system throughput can be severely diminished. Any desired transmissions by the idled units are delayed which can negatively effect overall user satisfaction.

As the number or density of communications units grows this problem must be addressed. Using directional antennas to limit the number of units that are interfered with or idled can help but that also creates problems. For example, if a unit wishes to communicate with another unit that is using a directional antenna this will not be possible unless or until the antenna points in the direction of the unit. Another approach is power control but that is sub-optimum since the degree to which the power can be lowered is limited due to the signal strength requirement at the intended receiver. The problem with these approaches is they do nothing to change or take advantage of fundamental propagation characteristics. Obviously better methods and apparatus for adapting antenna visibility are needed.

BRIEF DESCRIPTION OF THE DRAWINGS

The accompanying figures, where like reference numerals refer to identical or functionally similar elements throughout the separate views and which are incorporated in and form part of the specification, serve to further illustrate various embodiments in accordance with the present invention. The figures together with the detailed description, hereinafter below, serve to explain various principles and advantages in accordance with the present invention.

DETAILED DESCRIPTION OF PREFERRED EMBODIMENT

Figure 1:
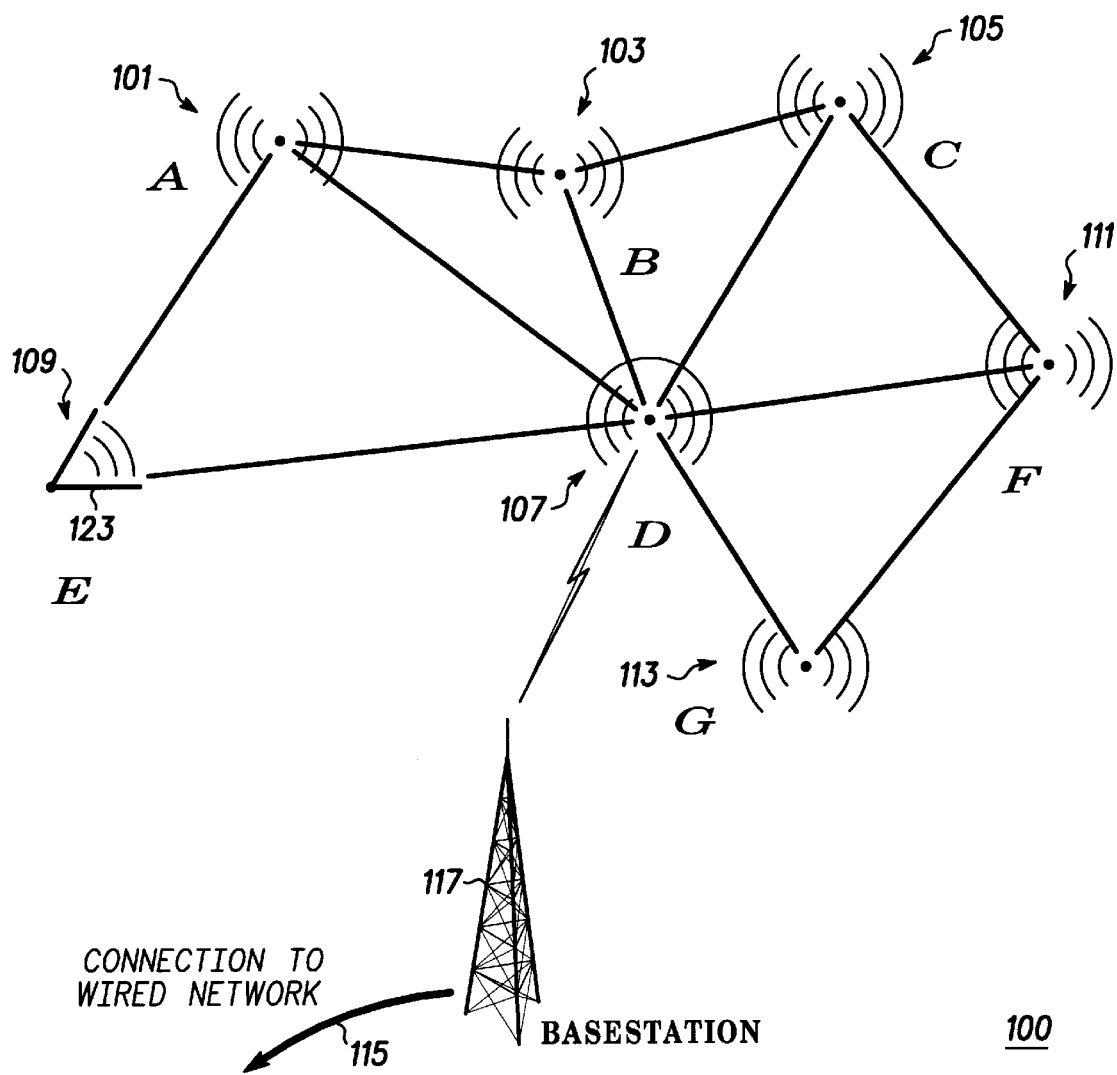
FIG. 1 depicts, a simplified block diagram of a prior art communications network.

In overview form the present disclosure concerns communications systems that provide service to communications units or more specifically user thereof operating therein. More particularly various inventive concepts and principles embodied in methods and apparatus for improving service availability by adjusting or adapting antenna visibility in a mesh or hybrid (combination of mesh and point to multipoint (PMP)) communications system or network for users are discussed.

The communications systems of particular interest are those being deployed and developed, commonly referred to as fixed wireless networks, that operate in an ad-hoc manner to form links amongst peers (mesh architecture) or in a PMP and thus collectively a network. Such systems typically operate in the 2–40 GHz range and often under ISM frequency allocations and rules. Normally they are best suited for wireless packet data communications systems and may be expected to employ IP addressing techniques including IPv6. To-date mobility within such systems is limited to relatively small ranges.

As further discussed below various inventive principles and combinations thereof are advantageously employed to use antenna systems having adjustable, variable, adaptable visibility to other communications units within the network, thus limiting the number of neighbor communications units or peer units that will be impacted by or will impact communications from a given unit. This will alleviate various problems associated with known systems while still facilitating setting up sessions or links with or between groups of units or users provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to unfairly limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented in part or total with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore further discussion of such software, if any, will be limited in the interest of brevity and minimization of any risk of obscuring the principles and concepts in accordance with the present invention.

Figure 2:
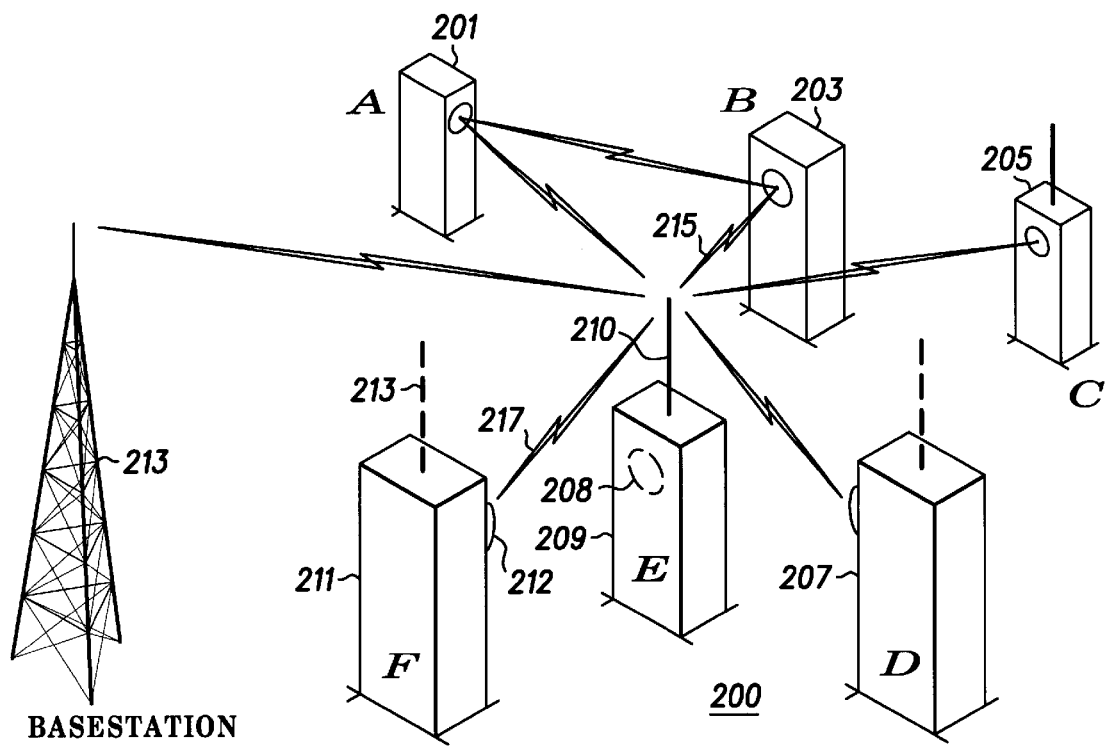
FIG. 2 depicts, in a simplified and representative form, one preferred embodiment of a fixed wireless system according to the present invention.

FIG. 2 depicts, in a simplified and representative form, one preferred embodiment of a fixed wireless system 200 according to the present invention. It is expected that a discussion of FIG. 2 will help provide some common language as well as familiarize the reader with some of the problems of present systems and some of the opportunities envisioned by the principles and concepts according to the present invention. Included in the system 200 is a multiplicity of wireless communications units (WCUs) shown generally as open rectangles indicative of a building A–F, 201–211. These units are both subscriber units and peer units and would be expected to be deployed one or more per household or business location to provide a gateway to other resources or users at other locations for local area networks and users at the households and business locations. Unit E is shown coupled to a base station 213 in a PMP mode and the base station 213 can be a gateway to wired wide area networks such as the PSTN or Internet at 115 or a gateway to other groups or clusters of WCUs.

This network can use code division, time division, or frequency division multiple access technologies but will be described herein, to the extent judged necessary, in terms of a time division duplex system. The system can use one or more known modulation techniques and protocols for the various stack levels. For example 802.11a is a time division duplex (TDD) system that specifies Orthogonal Frequency Division Multiplexing (OFDM) with multi-level modulation and coding to achieve data rates that may be selected based on the signal to noise ratio of the channel.

Each of the WCUs is shown with an antenna system. Certain of the WCUs, C–F 205–211, are shown with an antenna system having adjustable or adaptable visibility to other WCUs and thus the fixed wireless network. For example considering WCU E 209, a lower visibility antenna structure 208 (depicted as a dotted line below the roof line) and a higher visibility antenna structure 210 (depicted as a solid line above the roof line) is shown. The solid line is chosen to indicate the active antenna of the two depicted so WCU 209 is operating with the high visibility antenna 210 while WCU D is operating with the lower visibility antenna. WCU F 211 is shown with the lower visibility antenna 212 being used or active and the higher visibility antenna 213 not being active.

Although each unit is shown with the same antenna or antenna choice, above or below the roofline, this is not essential to take advantage of the principles and concepts of the present discussions. For example which side of a house an antenna is installed on may impact the relative visibility of the antenna to other users and the network. In fact more elaborate antenna systems than those depicted as 208 and 210, one below and one above the roof line, may be deployed. For example either one or both of these may be comprised of a multiplicity of antenna elements.

These antennas with multiple elements can then be used in a number of known ways, such as, t provide transmit or receive diversity, form antenna beams, or to participate in open or closed loop multiple transmit multiple receive (MTMR) communication links. MTMR techniques are used to provide multiple data stream, which is referred to as multi-stream communication links. Polarized elements and polarization diversity may also be considered.

In any event as depicted in FIG. 2, WCU E using the higher visibility antenna 210 is able to see the base station 213 as well as all other WCUs. Acting on behalf of what is often termed the cluster, WCU E will operate in a PMP mode to relay messages, as required, amongst the other WCUs and to/from the base station. The other WCUs will operate in a mesh mode with limited or lower visibility antennas and thus limited visibility to other neighbor or peer WCUs. In a practical system it is likely that each WCU will still be able to see a few of its neighbors but significantly less than if it were operating with the higher visibility antenna. For example, there is a link shown between WCU A and WCU B.

Each unit that can see or is within communications range of a number of other units can form links or communications paths or channels with those other units. Each or many of the WCUs, in addition to WCU E, can also relay information or signals from an originating WCU to a target WCU and there may be more than one such relay to complete a connection between the two. This redundancy, the ad-hoc nature of these links and the formation of them, and the relay capabilities are some of the attractions of mesh networks.

Figure 3:
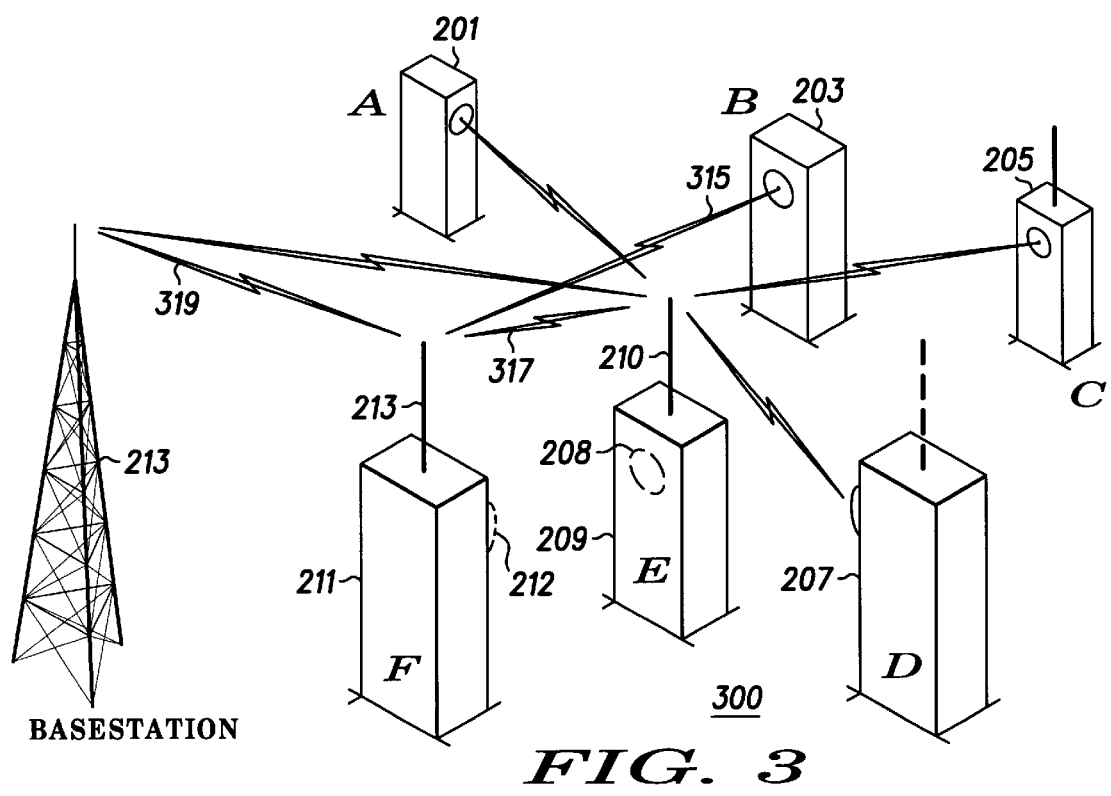
FIG. 3 depicts, the fixed wireless network of FIG. 2, adapting antenna visibility according to the present invention.

One more principle or concept can be examined by considering the ability of the network to use the variable antenna visibility to adapt the wireless network or communications paths or links therein to changing conditions such as traffic patterns or loads. Suppose WCU B 203 needs significantly higher bandwidth or capacity than presently available through WCU E. Referring to FIG. 3 the fixed wireless network 200 of FIG. 2 is shown after adapting antenna visibility in accordance with the present invention. In essence the fixed wireless network 300 of FIG. 3 when compared to the network of FIG. 2, indicates that WCU F 211 is now using the higher or greater visibility antenna 213 and has disabled or inactivated the lower visibility antenna 212. The links 215 and 217, in FIG. 2, from WCU E to, respectively, WCU B and WCU F have been dropped and replaced by links 315 and 317 from WCU F to, respectively, WCU B and WCU E. Additionally WCU F 211 can now see the base station 213 via link 319. Essentially the capacity or bandwidth available to the cluster and particularly WCU B has been increased.

Different antenna visibilities are achieved by taking advantage of differences in path propagation properties rather than merely differences in transmitted power or channel power levels. Power control and directional antennas do nothing to change the fundamental propagation properties of a particular path and thus are sub-optimum approaches. The most effective and preferred way to change propagation properties is to change the propagation path. At the frequencies of interest here a practical method of choosing different propagation paths is to select different installation locations for the antenna. To provide a high visibility antenna install an antenna or antenna structure on a rooftop, above or above most of the surrounding clutter such as nearby obstacles like other buildings, trees and etc. A low or lower visibility antenna can be provided by locating the antenna structure within the clutter, namely below the roofline among the nearby obstacles such as buildings, trees and the like.

The rooftop or higher visibility antenna will be visible from larger distances and the radio propagation path from this antenna will tend toward line-of-site with low intercept, shallow slope, and reduced shadow fading sigma. It is probable that this higher visibility antenna can be used to establish links with nearby base stations and neighboring houses with lower visibility antenna systems. The below roofline lower visibility antennas are normally not visible and propagation paths to/from such antennas usually must pass by obstacles or clutter. This increases path losses and impacts the path propagation model with a harsher intercept, slope, and shadow-fading component. Fortuitously, this helps to improve attenuation for potential interferers.

By providing two or more antennas each with different visibility at a WCU or node and capability to select among these antennas an operator or system manager can adjust the visibility of individual nodes in order to maximize or optimize the number of mesh nodes that are simultaneously transmitting or the amount of traffic or demand being carried or satisfied. The operator can dynamically adjust link rates in response to specific load demands by, for example, decreasing the visibility of surrounding or neighboring nodes. Experimental simulations have shown a surprising and unexpected order of magnitude increase in average data rates on a target link by selectively lowering the antenna visibility for surrounding nodes. Note that when a system is initially deployed and the node or subscriber or WCU density is low with corresponding larger distances between nodes the higher visibility above rooftop antennas can be used almost exclusively. As density increases more of the lower visibility antennas will be preferred and some of the initially rooftop antennas may be deactivated in favor of their lower visibility, below roofline, counterparts, thus keeping interference levels in check. The approach of including multiple (two or more) antennas and installing them to have varying visibility also facilitates self installations as, both, harm to overall system performance and individually poor results, both due to poor choice of installation location on behalf of the subscriber, can be avoided or at least corrected if not altogether avoided.

Figure 4:
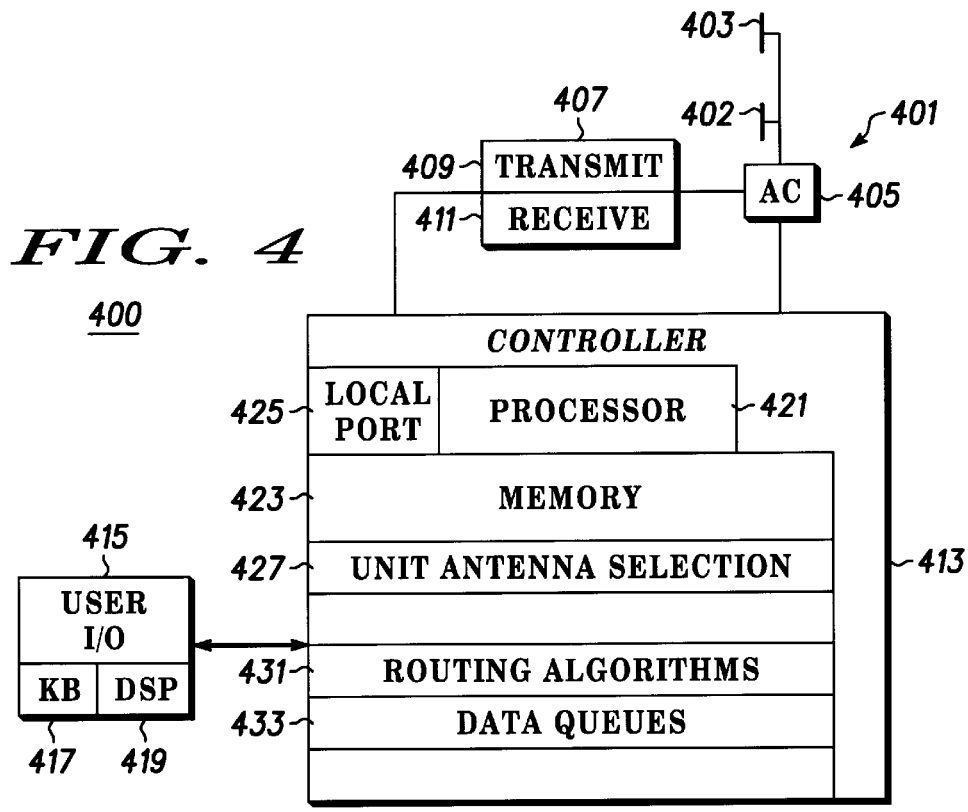
FIG. 4 illustrates in block diagram form, a preferred embodiment of a wireless communications unit in accordance with the present invention.

FIG. 4 illustrates in block diagram form, a preferred embodiment of a wireless communications unit (WCU) 400 in accordance with the present invention. The WCU 400 would be suitable for any of the WCUs or subscriber units in FIG. 2, namely A–F 201–211. The wireless communications unit (WCU) is arranged and constructed to operate in and provide service in a fixed wireless network such as the networks 200, 300 of FIG. 2, FIG. 3. The WCU includes an antenna system 401 having adjustable visibility to the fixed wireless network that further includes antennas or antenna structures 402, 403, preferably, a first and higher visibility antenna 403 and a second and lower visibility antenna 402, and an antenna controller 405 that is arranged to provide for selection of one or more of the antennas 402, 403. These antennas are preferably arranged for mounting at different elevations with 403 at a higher elevation than 402, for example rooftop versus below roofline. Note the antenna system could as well include three or more individual antennas or antennas with multiple elements with appropriate antenna structures and antenna controllers. These antenna systems and the specifics of selecting one or another antenna will be discussed further with reference to FIGS. 5 and 6. Our discussions here will focus on the antenna system control approaches that provide the advantages described when controlled and utilized according to the inventive principles and concepts described in the present disclosure.

The antenna system 401 inter-couples signals to a transceiver 407 that is included in the WCU 400. The transceiver includes a receiver 411 for receiving signals from and a transmitter 409 for transmitting or sending signals to the fixed wireless network, specifically other WCUs or wireless resources in the network. The transceiver is comprised of and operates according to various known radio frequency technologies. The transceiver and antenna system are coupled to a controller 413 and the controller is, preferably, coupled to a user input output function (I/O) 415 that, preferably, includes a conventional keyboard 417 or keys and display 419. The user I/O allows for a user to interact with the WCU as needed.

The controller 413 includes a processor 421, preferably a microprocessor that is widely available from manufacturers such as Intel and Motorola and that is coupled to a local port 425 and a memory 423. The local port is often a known 10/100 base T port or equivalent that will typically interface to a local area network (LAN) such as found in a household or small business establishment or a local modem and computer according to known and particular network practices or specifications. This interface will allow and provide for connectivity for users of that LAN via the fixed wireless network to other users and resources. The memory is, preferably, comprised of a combination of RAM, PROM, and possibly magnetic memory all as is known. The memory 423 includes software instructions and parameters that when executed and utilized by the processor causes the controller to control the transceiver and directional antenna system to send and receive signals from other WCUs in accordance with the protocols and other operational conventions that will depend on the particular network.

More particularly the memory includes one or more antenna selection routines 427 for the WCU or unit's transmitter and receiver. In addition the memory includes routing algorithms 431 that are known or being developed for routing within a mesh or fixed wireless network that are also likely to be dependent on the operating conventions of the particular network. The Website:

www.cse.ucsc.edu/research/ccrg/projects/wings.html includes a number of papers on routing algorithms that may be informative. Further the memory includes data queues 433 or databases for storing data received via the local port or from one WCU until it can be relayed or sent to a further WCU.

Briefly the WCU operation in a fixed wireless network includes the transceiver functioning for receiving and transmitting signals from and to other WCUs within the fixed wireless network. The antenna system has adjustable or variable or adaptable visibility to the fixed wireless network and other WCUs and operates to inter-couple the signals to the transceiver. The controller is coupled to the transceiver and the antenna system, to control the transceiver and to adjust the visibility of the antenna system such that the visibility of the WCU to the fixed wireless network is adjustable or variable as require or directed.

The antenna system includes a plurality of antennas with a first antenna having greater visibility to the fixed wireless network than a second antenna and this is preferably accomplished by arranging for the first higher visibility antenna to be mounted or installed at a higher elevation than the second and lower visibility antenna. Typically the controller 413, preferably, as directed by a system operator will adjust the antenna system to a higher visibility antenna when the WCU is operating in a point to multi-point mode, such as WCU E 209, than when the WCU is operating strictly as a subscriber in a mesh network mode, such as WCU D 207.

There are a multiplicity of scenarios where it is anticipated that the visibility to the network of the WCU would need to be adjusted. These fall in generally three categories. One category is where a local operator or user initiates the adjustment of the visibility by, for example, using the user input output function to initiate an adjustment or specifically a selection of one antenna over another. This may be motivated by an instruction booklet upon initial installation or in accordance with service or trouble shooting guidelines for correcting or starting service for the WCU. The user I/O 415 would cause the controller 413 using the unit antenna selection routines 427 to control or select the appropriate antenna via the antenna controller 405.

A further category is volitional control by the controller, preferably resulting from executing the antenna selection routines 427 to thereby adjust the visibility or select the proper antenna, for example, responsive to a bandwidth requirement of the WCU or responsive to a density or apparent density of other WCUs. For example if the WCU has a lengthy video to transfer to another WCU it may determine that the bandwidth requirement for this task merits selecting a higher visibility antenna for the duration of the transfer. Similarly the controller via the routines and transceiver can sense the number of other WCUs that are visible or within range of its receiver and when that number is to high (10 WCUs for example) operate to select a lower visibility antenna or when to low (two or less WCUs) a higher visibility antenna. It is preferable that such volitional control of the antenna visibility be subject to constraints. These constraints may either be preprogrammed into the WCU or received in a control message from the network controller or administrator. These control messages can be directed to the WCU in an over the air message received at the transceiver or over a wired connection such as the PSTN via the local port 425. These constraints may include time of day (low visibility during busy periods) or calendar dates (low visibility only during winter months when there are no leaves), or number of other WCUs visible (the 2 to 10 numbers above), or traffic loads and so on.

The third category and likely most practical is receiving a control message and adjusting the visibility of the antenna responsive thereto, again over the air or over a wired connection from a network controller or based on a request from another WCU. The visibility of the WCU to the network can be adjusted responsive or as a result of any number of parameters such as a coverage requirement, a signal to interference plus noise ratio, a routing parameter, a delay requirement, or a capacity requirement. These adjustments can be dynamic or responsive to changing and current conditions for any or each of them. Since the unit preferably operates in a TDD mode the antenna visibility can be selected depending on the target unit and can vary from link to link. For example if the high visibility antenna is selected at WCU E and a message is received from the base station in FIG. 2 that is to be relayed to one of the other units such as WCU F it is possible that the lower visibility antenna for WCU can be utilized for this task.

We have described a wireless communications unit (WCU) having adaptive visibility to a fixed wireless network that includes a plurality of wireless communications units (WCUs) that includes a transceiver to transmit and receive signals; and an antenna system having adjustable visibility to the fixed wireless network. The transceiver and the antenna system are inter-coupled and cooperatively controlled to transmit and receive signals to and from other WCUs in the fixed wireless network. The visibility of the antenna system is adjusted to a first value when the transceiver is operating in a mesh network mode as a subscriber in a cluster of WCUs and a second value when the transceiver is operating in a point to multipoint mode, the second value representing higher visibility than the first value. The visibility is adjusted to the second value when the WCU is operating as a point-to-point access point for the cluster of WCUs.

Figure 5:
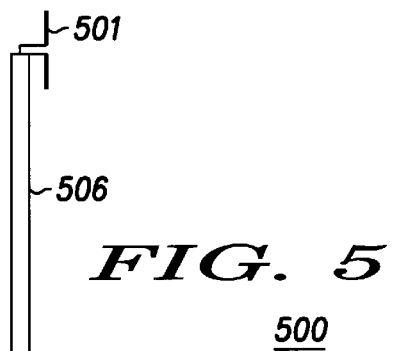
FIG. 5 and FIG. 6 show alternative embodiments of an antenna system having adjustable visibility.
Figure 6:
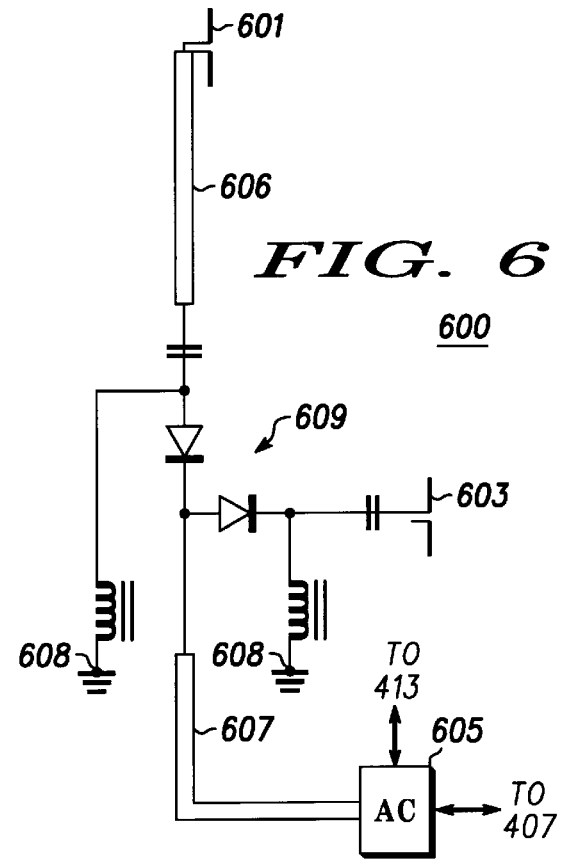

Referring to FIG. 5 and FIG. 6 alternative embodiments of an antenna system having adjustable visibility is shown. FIG. 5 shows one antenna system suitable for use as the antenna system 401. The system includes an antenna controller 505 shown coupled to the transceiver 407 and the controller 413. The antenna controller is feeding a first dipole antenna 501 with a feed line 506 and a second dipole antenna 503 with feed line 507 each antenna having dimensions suitable for the operating frequency of the fixed wireless network as known. The feed lines 506 and 507 are coaxial cables suitable for the frequency of interest as known. The first dipole is depicted as installed at a higher elevation or with a longer feed line than the second dipole and would be expected to be the antenna with the higher visibility in an actual installation. Of course in those embodiments where either antenna is comprised of multiple elements additional elements would be mounted in proximity to one or both dipole units and each of the additional elements would typically have their own feed line. The antenna controller would include a coaxial switch (not specifically shown) that is controlled by the controller to select which dipole antenna, high or low visibility, to couple to the transceiver.

FIG. 6 shows a further antenna system suitable for use as the antenna system 401. The system includes an antenna controller 605 shown coupled to the transceiver 407 and the controller 413. The antenna controller is feeding a first dipole antenna 601 and a second dipole antenna 603 each having dimensions suitable for the operating frequency of the fixed wireless network as known. The feed line for dipole 603 is a coaxial cable 607 and the feed line for dipole 601 includes both coaxial cable 607 in series with coaxial cable 606, the coaxial cables suitable for the frequency of interest as known. The first dipole 601 is depicted as installed at a higher elevation and with a longer feed line than the second dipole 603 and would be expected to be the antenna with the higher visibility in an actual installation. The antenna controller would include a power supply (not specifically shown) that is capable of generating a positive and negative DC potential with respect to neutral nodes 608. The positive potential activates a pin diode switch to inactivate dipole 601 and to activate or couple dipole 603 to the coaxial feed line 607. The negative potential inactivates antenna or dipole 603 and couples coaxial feed line 606 and thus dipole 601 to coaxial feed line 607 and thus antenna controller 605. The appropriate potential would be switched to the center lead of the coaxial cable by the antenna controller 605 as controlled by the controller to select which dipole antenna, high or low visibility, to couple to the transceiver. As suggested above additional feed lines would connect to additional antenna elements, preferably, placed in proximity to dipole 601 or 603 to provide antenna functions such as diversity, beam forming, etc.

Figure 7:
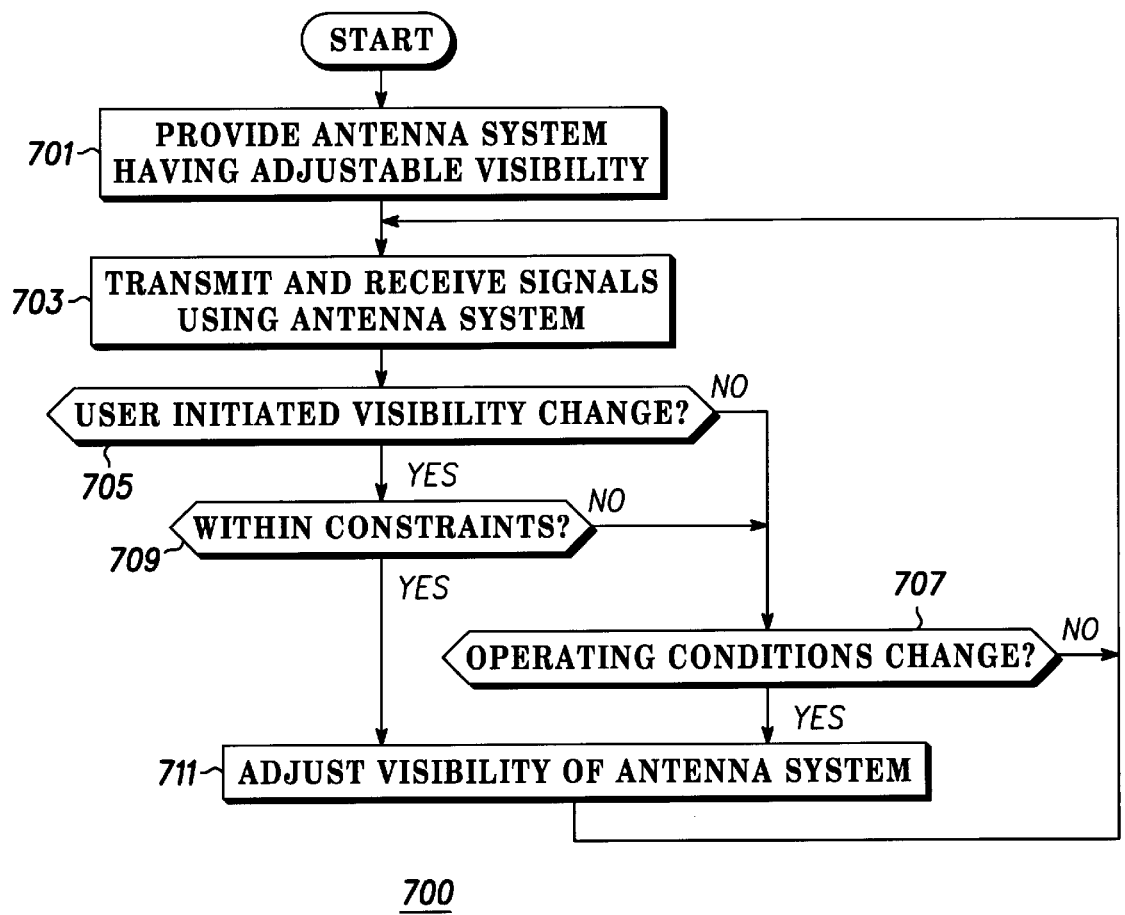
FIG. 7 shows a flow chart of a preferred method embodiment according to the present invention.

FIG. 7 shows a flow chart of a preferred method embodiment according to the present invention. A review of FIG. 7 will serve largely as a summary of certain of the basic processes, generally discussed above, that are occurring according to the principles and concepts of the present disclosure. The method 700, preferably occurs in a WCU and is method of adapting visibility of the WCU to a fixed wireless network thereby providing services in the network. The method 700 begins at 701 by providing an antenna system having adjustable visibility to the fixed wireless network, preferably, providing a plurality of antennas with a first antenna arranged, for example, to mount at a higher elevation and having greater visibility than a second antenna. Then at 703 the process shows transmitting and receiving signals to and from or with the fixed wireless network using the antenna system.

The balance of the process deals with adjusting and under what circumstances to adjust the visibility of the antenna system and thus WCU to other WCU within the network. At 705 we determine whether the user, using a user I/O function of the WCU has initiated or requested a change in the antenna visibility perhaps motivated as discussed above. If the result at 705 is affirmative step 709 tests whether the requested change is within any constraints that may be applicable to changes in the visibility of the antenna system. These may be preprogrammed constraints or may be constraints that have been dictated via a control message from a network controller or administrator. If not within applicable constraints or if step 705 were negative the process goes to step 707. At 707 the process tests whether some other operating condition has changed thus requiring a change in the antenna visibility. If not the process returns to step 703 and continues to operate within the network.

Examples of various operating conditions that may result in a visibility modification or change have been discussed above but will be overviewed here. Adjustment of the antenna system to a higher visibility would be indicated when the WCU has changed to operating in a point to multi-point mode from operating in a mesh network mode. Bandwidth requirements sensed at the WCU or remotely, or a change in density of other WCUs or a coverage requirement, a signal to interference plus noise ratio, a routing parameter, a delay requirement, and a capacity requirement or changes thereto could indicate a change or adjustment to the antenna visibility. The operating condition change may be a control message received from a network controller or a request from another WCU that requires a higher bandwidth and thus a lower interference level from the WCU. In any event if the test at 707 or 709 are affirmative at 711 adjusting the visibility of the antenna system such that the visibility of the WCU to the fixed wireless network is adjusted up or down as appropriate is undertaken and the process returns to step 703.

The processes, discussed above, and the inventive principles thereof are intended to and will alleviate problems caused by prior art fixed wireless networks. Using these principles of providing and adjusting variable visibility antenna systems as above described is expected to minimize network interference between peer communications units as well as minimize the number of units idled by a given communications exchange thus facilitating connectivity for today and tomorrows consumers.

Various embodiments of systems, methods, and apparatus for adjusting these antenna visibilities thus providing or facilitating the providing of services in a fixed wireless network in an efficient and effective manner have been discussed and described. It is expected that these embodiments or others in accordance with the present invention will have application to many wireless local area networks that provide connectivity for their user or subscriber devices or units as well as such networks that are coupled to fixed or wired WANS such as the PSTN or internet. The disclosure extends to the constituent elements or equipment comprising such systems and specifically the methods employed thereby and therein. Using the inventive principles and concepts disclosed herein advantageously allows or provides for low latency and low network overhead access or links among communications units or devices and procedures for maintaining such access which will be beneficial to users and providers a like.

This disclosure is intended to explain how to fashion and use various embodiments in accordance with the invention rather than to limit the true, intended, and fair scope and spirit thereof. The invention is defined solely by the appended claims, as may be amended during the pendency of this application for patent, and all equivalents thereof.

What is claimed is:

1. A wireless communications unit (WCU) arranged and constructed to operate in a fixed wireless network comprising in combination:
   a transceiver for receiving and transmitting signals within the fixed wireless network;
   an antenna system for inter-coupling said signals to said transceiver, said antenna system having adjustable visibility to the fixed wireless network wherein said antenna system is adjusted to a higher visibility when the WCU is operating in a point to multi-point mode than when the WCU is operating in a mesh network mode; and
   a controller, coupled to said transceiver and said antenna system, to control said transceiver and to adjust said visibility of said antenna system such that the visibility of the WCU to the fixed wireless network is adjustable.

2. The WCU of claim 1 wherein said antenna system includes a plurality of antennas with a first antenna having greater visibility to the fixed wireless network than a second antenna.

3. The WCU of claim 1 wherein said antenna system includes a plurality of antennas where a first antenna incorporates multiple antenna elements to provide one of transmit diversity, receive diversity, beam forming, multi-stream transmission and multi-stream reception.

4. The WCU of claim 1 further including a user input output function that allows a user to initiate an adjustment of said visibility.

5. The WCU of claim 1 wherein said controller will adjust said visibility responsive to a bandwidth requirement of the WCU.

6. The WCU of claim 1 wherein said controller will adjust said visibility responsive to density of other WCUs.

7. The WCU of claim 1 wherein said controller will adjust said visibility responsive to one of a coverage requirement, a signal to interference plus noise ratio, a routing parameter, a delay requirement, and a capacity requirement.

8. The WCU of claim 7 wherein said controller will adjust said visibility responsive to a control message received from one of a network controller and another WCU.

9. The WCU of claim 7 wherein said controller will adjust said visibility subject to constraints within a control message received from a network controller.

10. In a wireless communications unit (WCU) a method of adapting visibility of the WCU to a fixed wireless network, the method including the steps of:
    providing an antenna system having adjustable visibility to the fixed wireless network;
    transmitting and receiving signals to and from the fixed wireless network using said antenna system; and
    adjusting said visibility of said antenna system such that the visibility of the WCU to the fixed wireless network is adjusted to a higher visibility when the WCU is operating in a point to multi-point mode than when the WCU is operating in a mesh network mode.

11. The method of claim 10 wherein said providing an antenna system includes providing a plurality of antennas with a first antenna having greater visibility to the fixed wireless network than a second antenna.

12. The method of claim 10 wherein said providing an antenna system includes providing a plurality of antennas where a first antenna incorporates multiple antenna elements to provide one of the functions of transmit diversity, receive diversity, beam forming, multi-stream transmission, and multi-stream reception.

13. The method of claim 10 wherein said adjusting said visibility of said antenna system includes adjusting to a higher elevation antenna when the WCU is operating in a point to multi-point mode than when the WCU is operating in a mesh network mode.

14. The method of claim 10 wherein said step of adjusting is initiated through a user input output function of the WCU.

15. The method of claim 10 wherein said adjusting said visibility is responsive to a bandwidth requirement of the WCU.

16. The method of claim 10 wherein said adjusting said visibility is responsive to a density of other WCUs.

17. The method of claim 10 wherein said adjusting said visibility is responsive to one of a coverage requirement, a signal to interference plus noise ratio, a routing parameter, a delay requirement, and a capacity requirement.

18. The method of claim 17 wherein said adjusting said visibility is responsive to a control message received from one of a network controller and another WCU.

19. The method of claim 17 wherein said adjusting said visibility is subject to constraints within a control message received from a network controller.

20. A wireless communications unit (WCU) having adaptive visibility to a fixed wireless network that includes a plurality of wireless communications units (WCUs) comprising in combination:
    a transceiver to transmit and receive signals; and
    an antenna system having adjustable visibility to the fixed wireless network, said transceiver and said antenna system inter-coupled and cooperatively controlled to transmit and receive said signals to and from other WCUs in the fixed wireless network, said visibility adjusted for a first value when said transceiver is operating in a mesh network mode as a subscriber in a cluster of WCUs and a second value when said transceiver is operating in a point to multipoint mode, said second value representing higher visibility than said first value.

21. The WCU of claim 20 wherein said visibility is adjusted for said second value when said WCU is operating as a point to point access point for said cluster of WCUs.

* * * * *